United States Patent Office 3,493,156
Patented Feb. 3, 1970

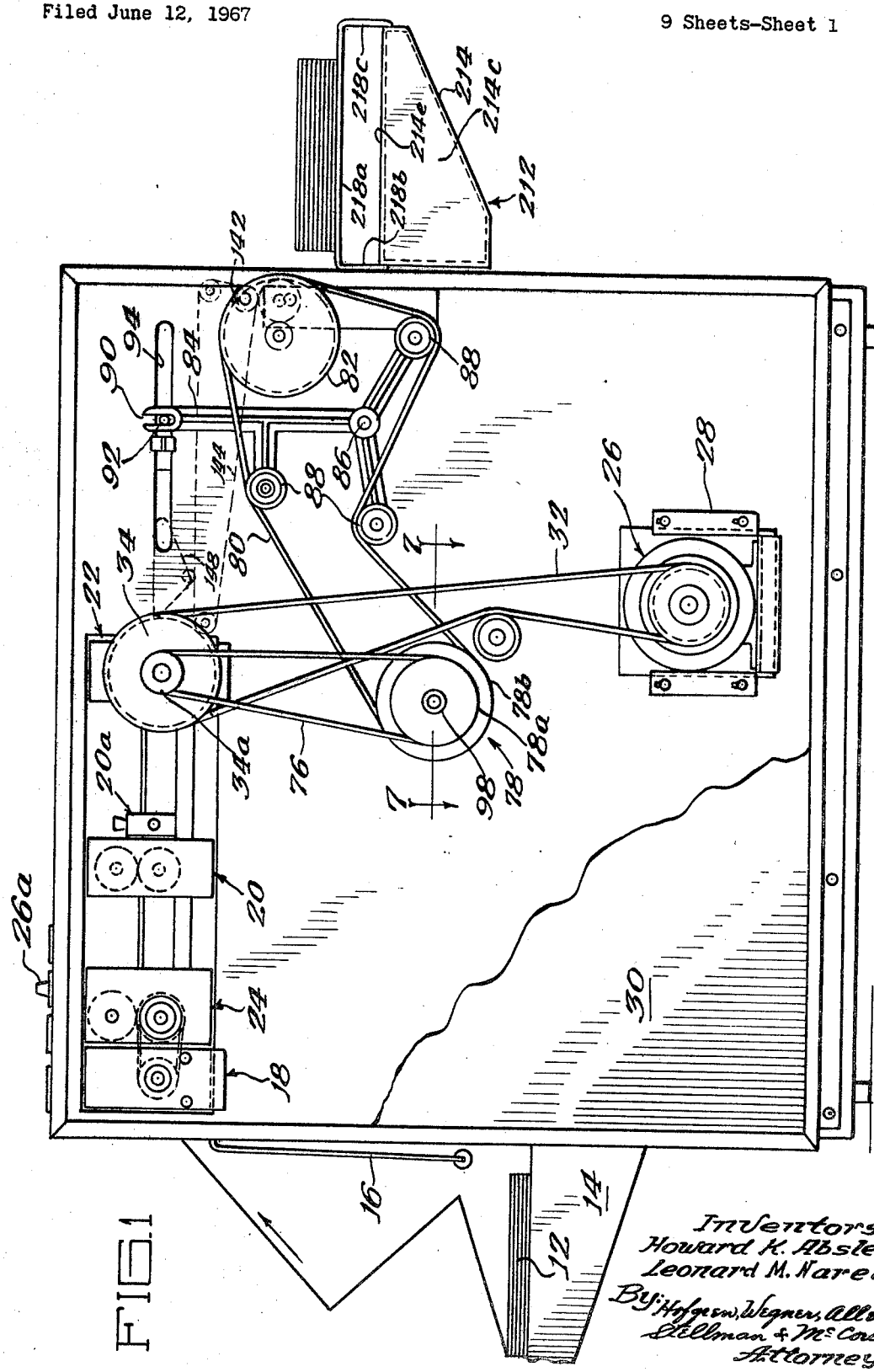

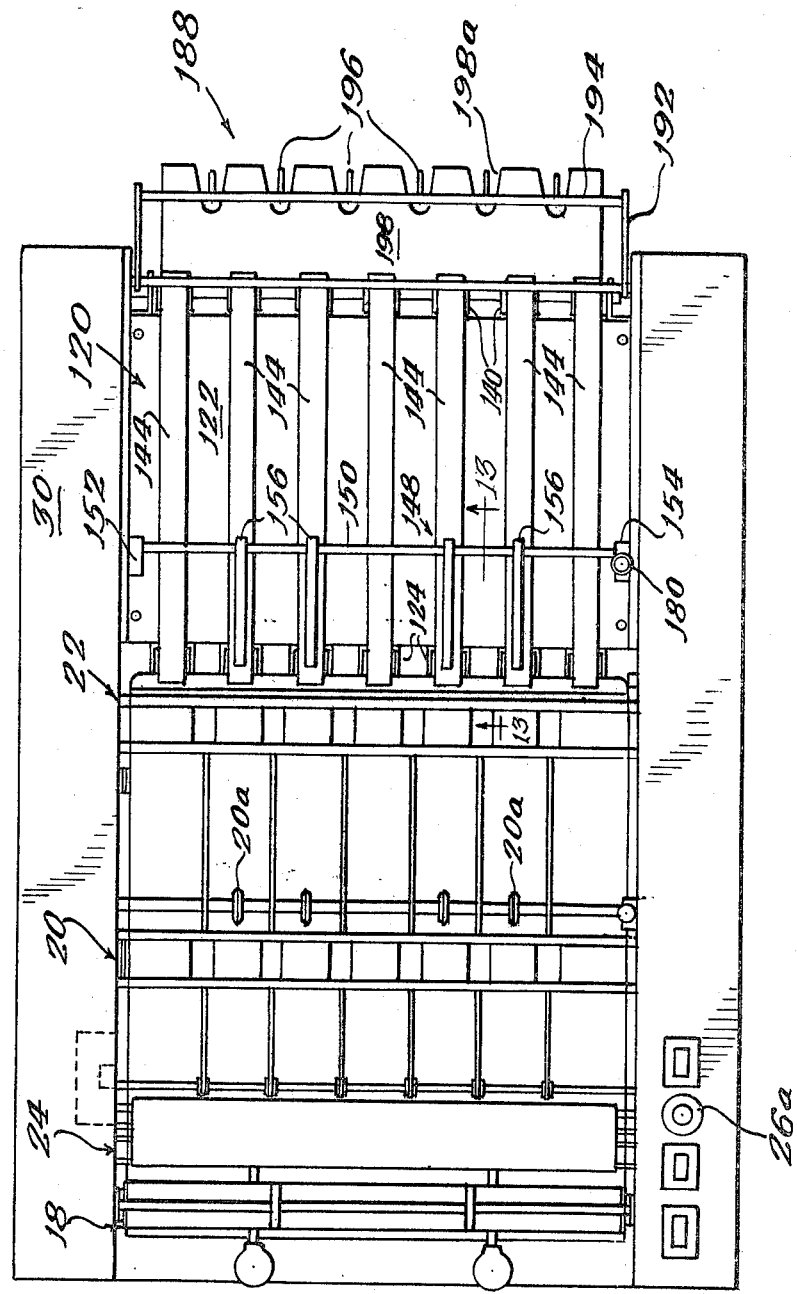

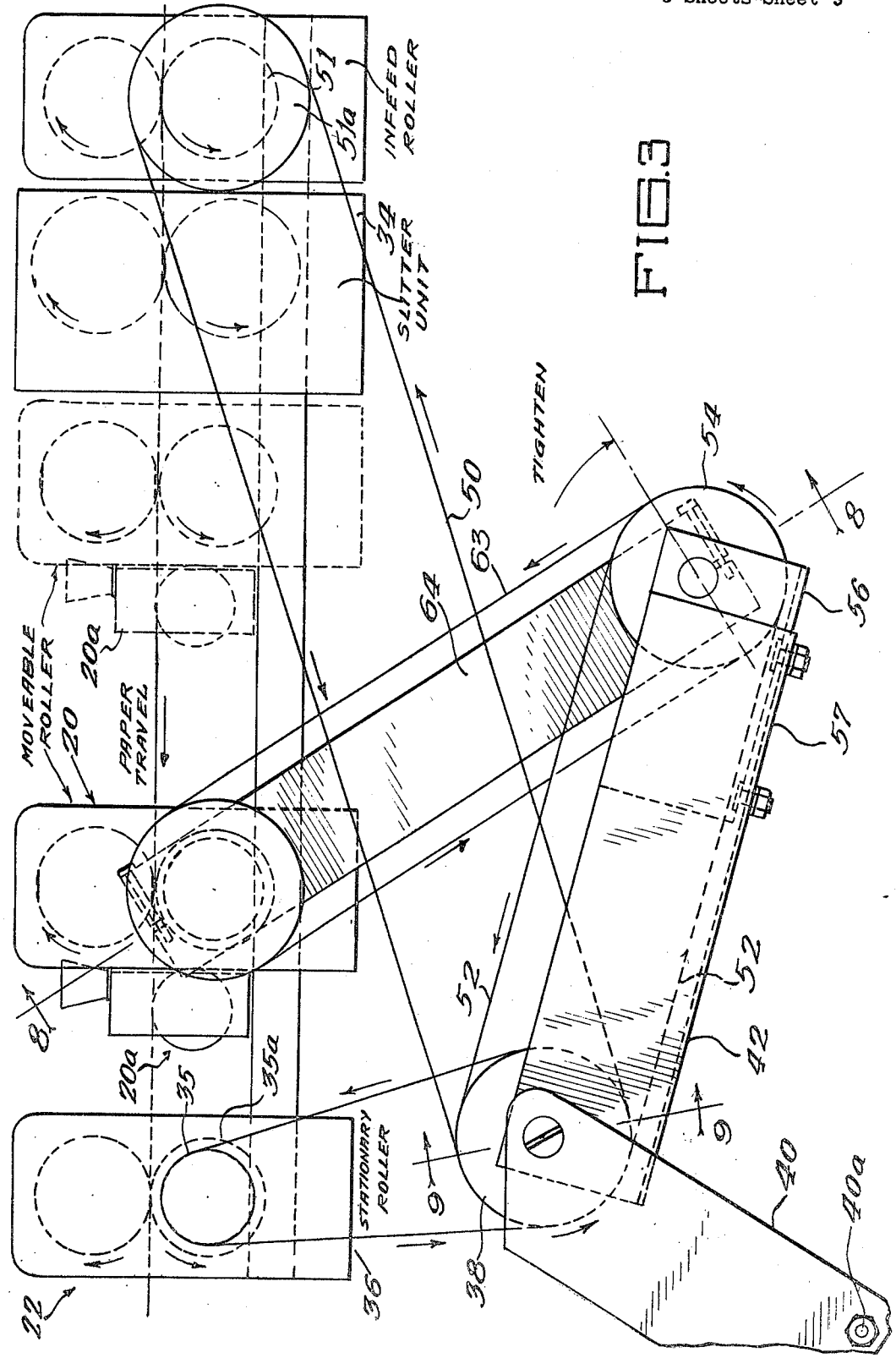

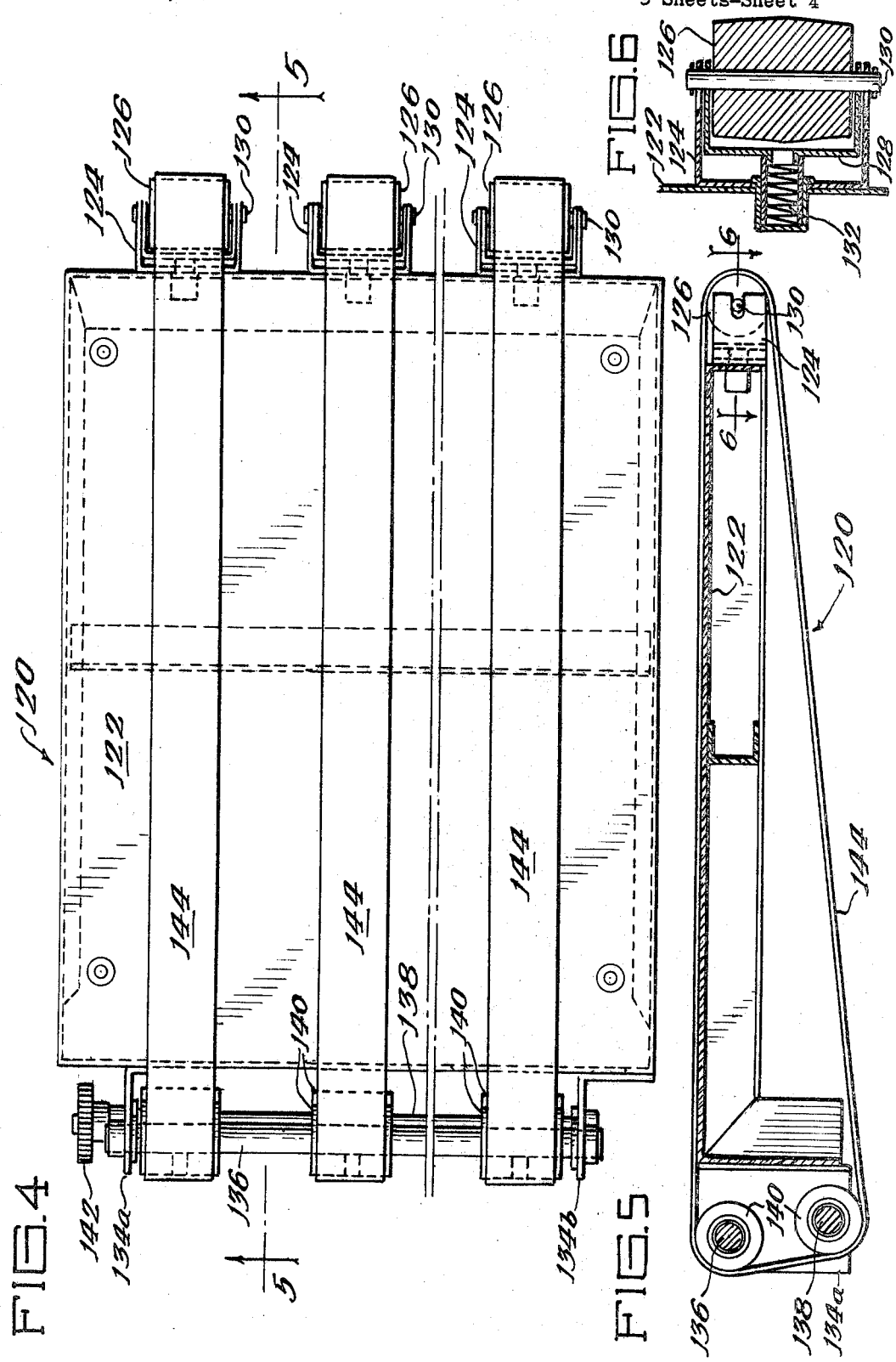

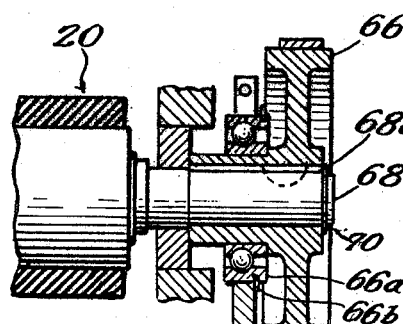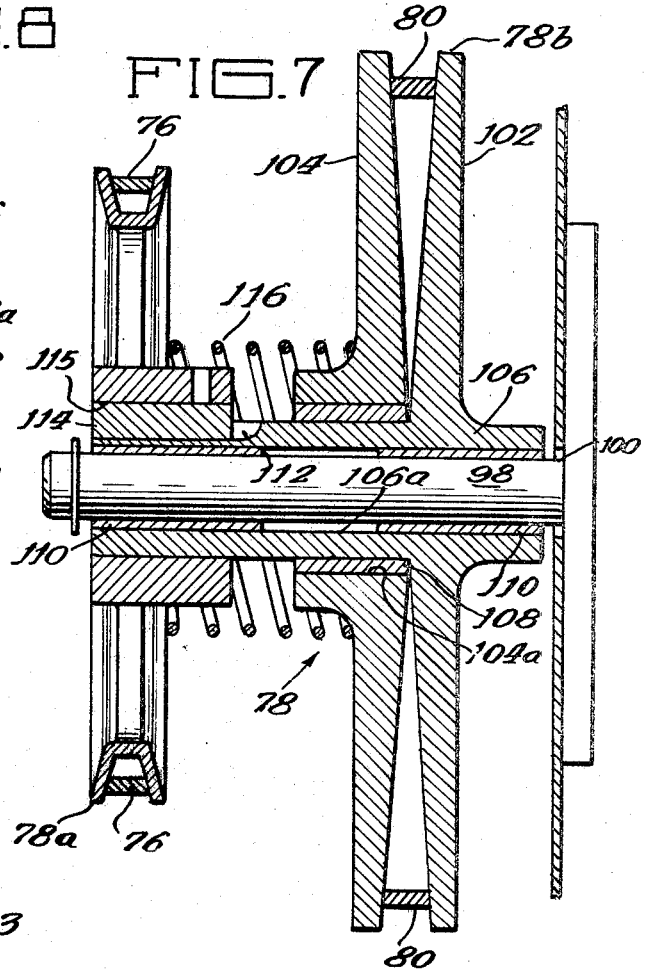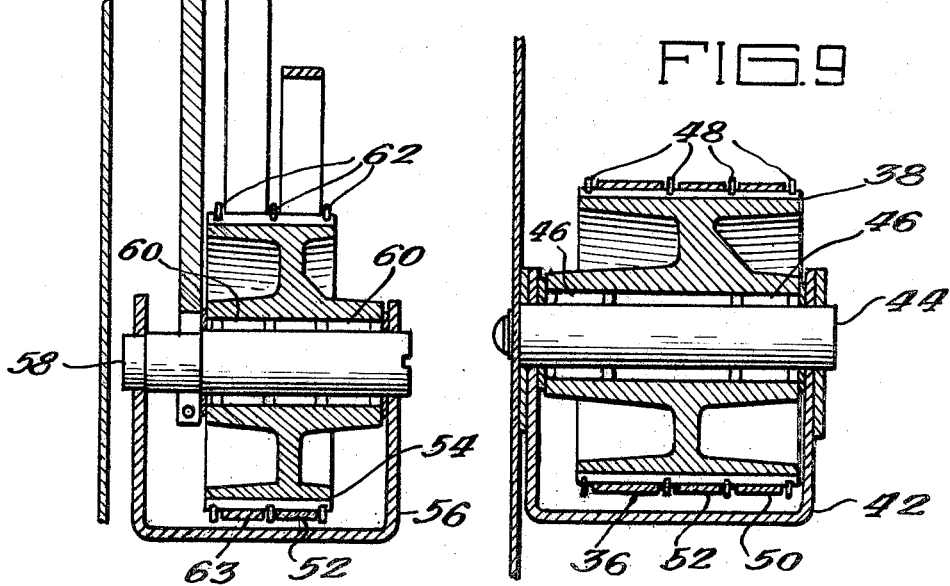

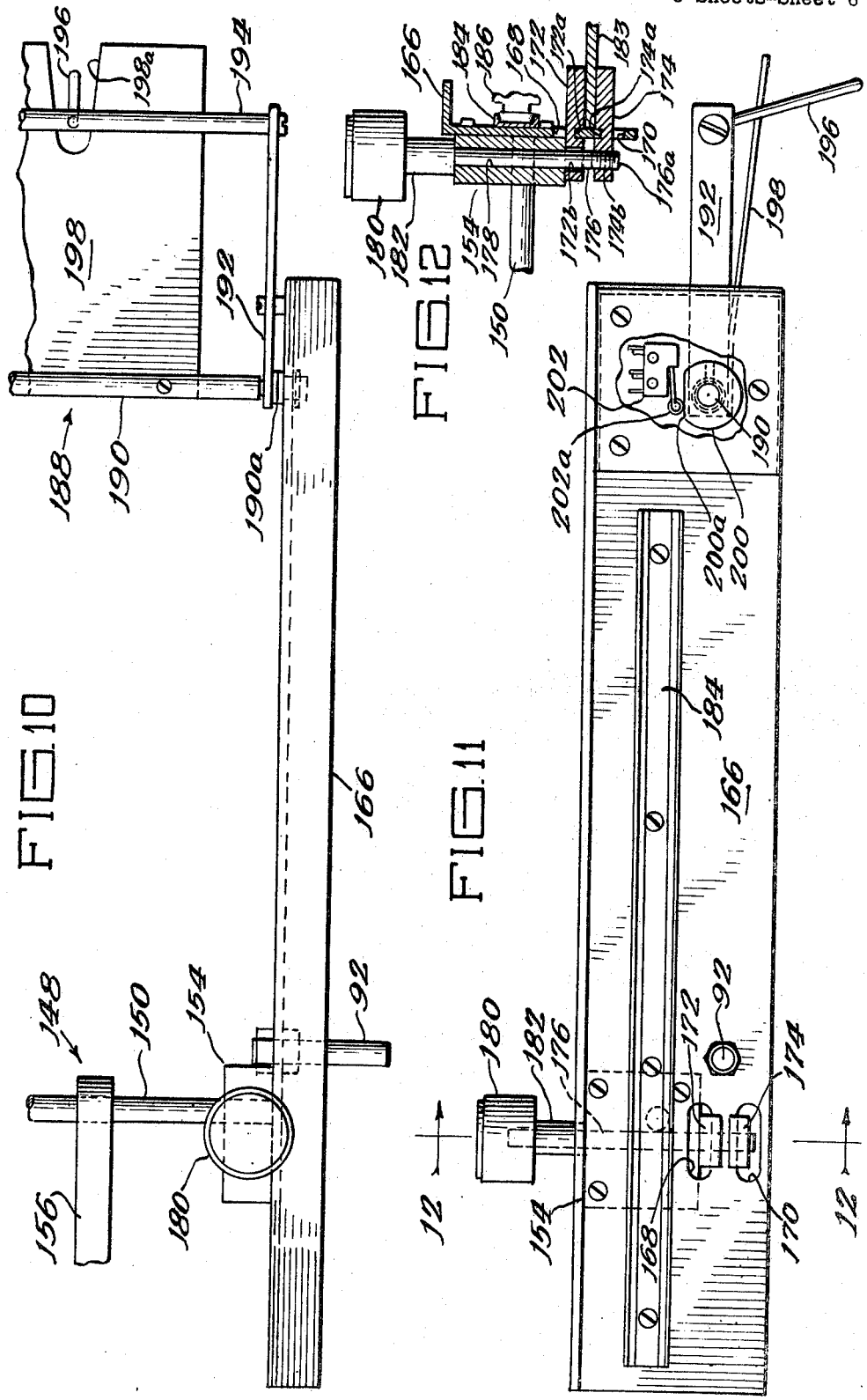

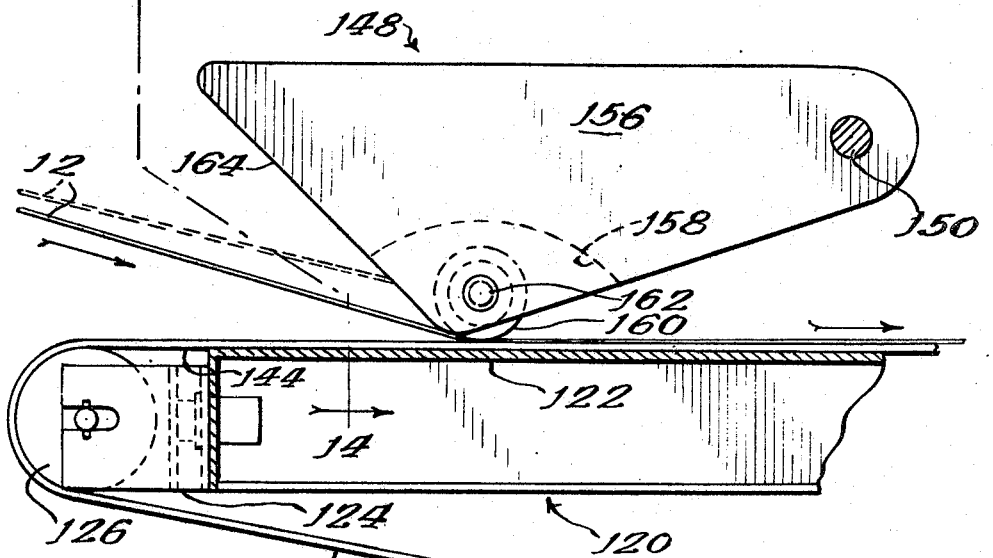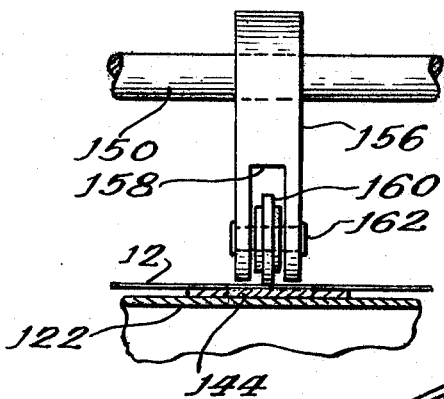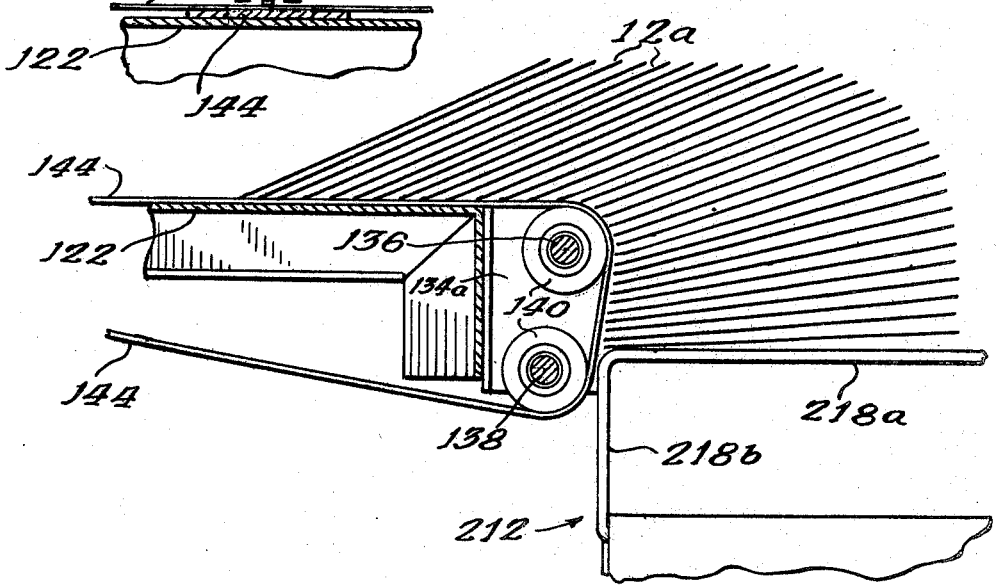

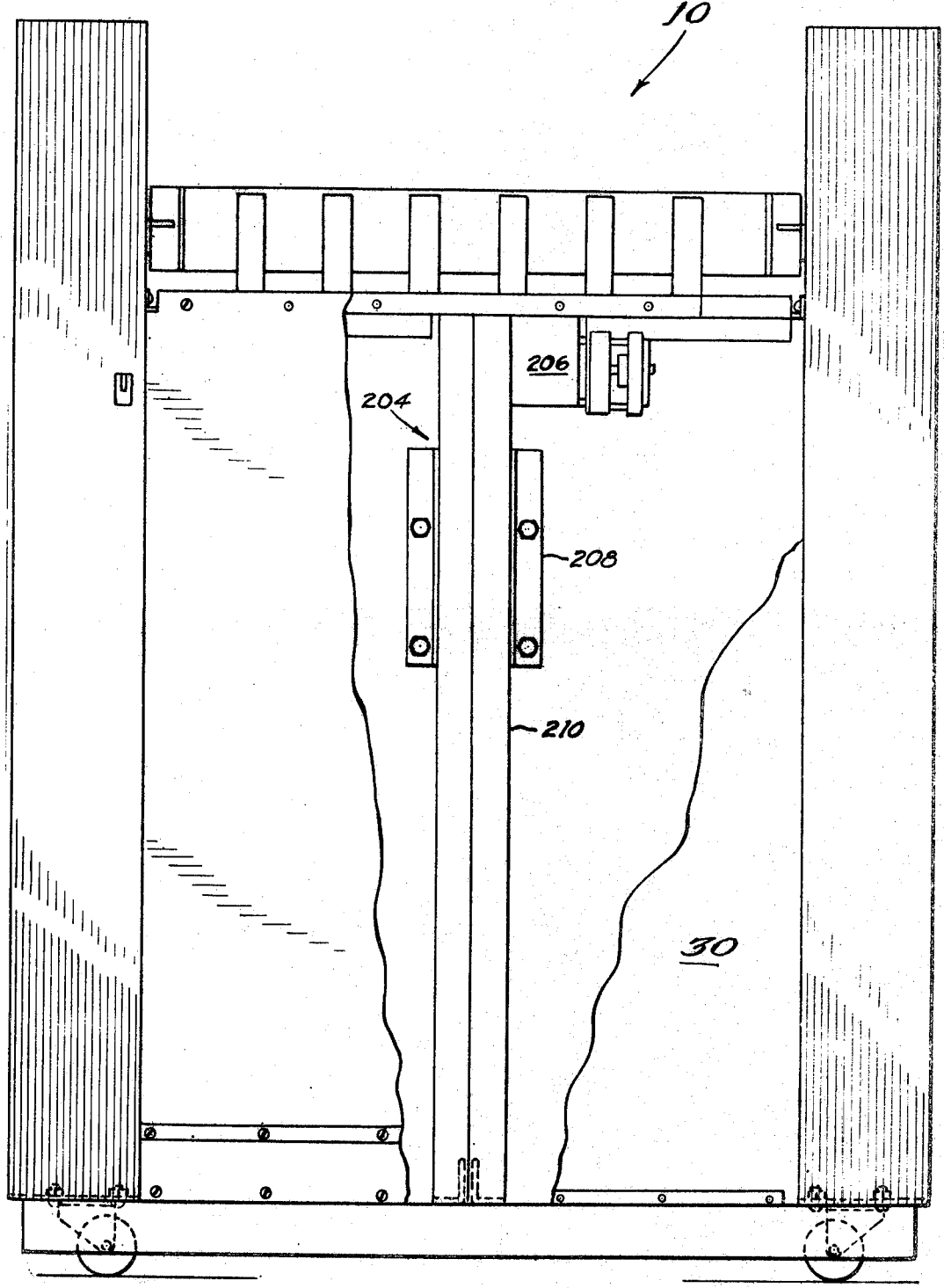

3,493,156
ADJUSTABLE OUTFEED ASSEMBLY FOR
STATIONERY BURSTER
Howard K. Absler, Skokie, and Leonard M. Narel, Cary,
Ill., assignors to Uarco Incorporated, a corporation of
Illinois
Filed June 12, 1967, Ser. No. 645,262
Int. Cl. B65h 35/10; B26f 3/00
U.S. Cl. 225—100
13 Claims

ABSTRACT OF THE DISCLOSURE

A burster mechanism for separating continuous form stationery into individual form lengths along transverse lines of weakening characterized in that the burster has a moving surface which carries separate form lengths away from the outfeed rollers in an overlapping relationship, the driving means for the moving surface being adjustable for changing the speed of the moving surface to accomodate form lengths of different dimension. Also, the moving surface has a portion which continually urges the separated form lengths into compacted stacks on a stacking tray, the stacking tray having portions movable with respect to the remainder thereof to accommodate uneven marginal areas of the form lengths. Furthermore, a nip roller assembly is provided across the path of the ejected form lengths which presents a rigid inclined surface to the form lengths ejected from the outfeed rollers and deflects the ejected form lengths into moving engagement with the moving surface.

BACKGROUND OF THE INVENTION

Field of the invention

This invention relates to business machines and more particularly to an apparatus for bursting stationery into individual form lengths along transverse lines of weakening.

Description of the prior art

Generally devices for separating continuous form stationery along transverse lines of weakening have three sets of rollers including an infeed set of rollers for initially feeding the stationery into the mechanism; a movable set of rollers, and a fixed set of outfeed rollers which is driven at a faster rate of speed than the movable set of rollers. The movable set of rollers is adjusted with respect to the fixed outfeed rollers depending upon the dimension of the individual form length which is being separated. A typical example of such a structure is that shown in Pine et al. Patent 3,161,335 issued Dec. 15, 1964.

From the outfeed set of rollers, the separated stationery form length may be ejected onto a stacking table as shown in the aforementioned Pine patent or onto a movable stacking surface as shown in the Peterson et al. Patent 3,261,603 issued July 19, 1966. In the Peterson patent, means are provided adjacent the outfeed rollers for deflecting each ejected form length and urging the same into contact with the moving surface. This means takes the form of a flexible deflecting strip as well as a large disc-like surface which the stationery first strikes and then is urged into engagement with the movable surface at the point of tangential contact therewith by the deflecting disc. The stationery is carried along the moving surface and stacked uprightly on its edge.

Recently, office machinery, such as high speed computer printing equipment, has been developed which is capable of running at a much faster rate of speed than the rate of speed at which prior structures were intended to operate. It is often desirable to process stationery through printing equipment and then through bursting equipment positioned in a tandem arrangement. However, if the bursting equipment is not capable of operating effectively at the same speed as the printing equipment, the total capability of the printing equipment cannot be used. It is the purpose of this invention to provide an improved burster mechanism which can be run both on and off line with sophisticated office equipment and that can run reliably enough to be unattended at speed ranges of 15 f.p.m. to 300 feet per minute.

Successful high speed operation of office machinery, such as bursters, may be dependent upon the separated stationery form length being stacked in an orderly and compact arrangement. This, in turn, may require controlled conveyance of the form lengths from the outfeed rollers of the bursters. In bursters having outfeed mechanism incorporating a movable surface, such as in the aforementioned Peterson patent, a substantial overlap of the forms is desirable. It has been found that a one-half inch overlap is an optimum condition. In order to maintain this optimum overlap condition, form lengths of shorter dimensions must be driven at a faster rate of speed along the movable surface away from the outfeed rollers than the rate of speed at which longer form lengths are driven.

SUMMARY OF THE INVENTION

This invention is directed, in brief, to the provision of a burster for separating continuous form stationery into individual form lengths along transverse lines of weakening wherein a movable surface is provided in the path of stationery travel beyond the outfeed rollers of the burster. Means for deflecting the ejected form lengths intersects the path of stationery fed outwardly from the outfeed rollers to deflect the same downwardly and into engagement with the moving surface. This deflecting means is in the form of an inclined surface which is adjustable toward and away from the outfeed rollers to accommodate different form lengths of stationery which are separated by the burster, and movement of the deflecting means for purposes of such adjustment changes the speed at which the movable surface is driven so that an optimum overlap of ejected forms will be continually maintained for carrying away the forms at a high rate of speed from the area of the outfeed rollers while maintaining an orderly orientation thereof. A descending stacking platform is positioned at the rear of the moving surface for receiving the forms and holding the same in a neat, stacked condition. A portion of the moving surface moves downwardly with the rear edge of each of the forms fed onto the stacked surface to continually maintain a compact stacked configuration. The stacking tray has portions at the opposite sides which may be swung downwardly and outwardly to accommodate the thicker marginal areas of the form length and promote even stacking.

BRIEF DESCRIPTION OF THE DRAWINGS

FIGURE 1 is a fragmentary side elevational view of the burster of this invention with portions broken away illustrating part of the drive system thereof;

FIGURE 2 is a top plan view of the burster of this invention;

FIGURE 3 is a diagrammatic view of the drive system on the opposite side of the burster from that illustrated in FIGURE 1;

FIGURE 4 is an enlarged broken view of the moving stationery platform portion of the burster of this invention;

FIGURE 5 is a section view taken generally along the lines 5—5 of FIGURE 4;

FIGURE 6 is a fragmentary enlarged section view taken generally along the line 6—6 of FIGURE 5;

FIGURE 7 is an enlarged fragmentary section view taken generally along the line 7—7 of FIGURE 1;

FIGURE 8 is an enlarged fragmentary section view taken generally along the line 8—8 of FIGURE 3;

FIGURE 9 is an enlarged fragmentary sectional view taken generally along the line 9—9 of FIGURE 3;

FIGURE 10 is an enlarged fragmentary plan view of a portion of the stationery outfeed assembly;

FIGURE 11 is a side elevational view of the structure shown in FIGURE 10 with a portion broken away for clarity of illustration;

FIGURE 12 is a fragmentary sectional view taken generally along the line 12—12 of FIGURE 11;

FIGURE 13 is an enlarged fragmentary section view taken generally along the line 13—13 of FIGURE 2;

FIGURE 14 is a fragmentary section view taken generally along the line 14—14 of FIGURE 13;

FIGURE 15 is a fragmentary section view of the outfeed area of the burster of this invention, showing the relationship between the stacking tray and the moving stationery platform;

FIGURE 16 is a rear elevational view of the burster of this invention with portions broken away for clarity of illustration;

DESCRIPTION OF THE PREFERRED EMBODIMENT

Figure 17:
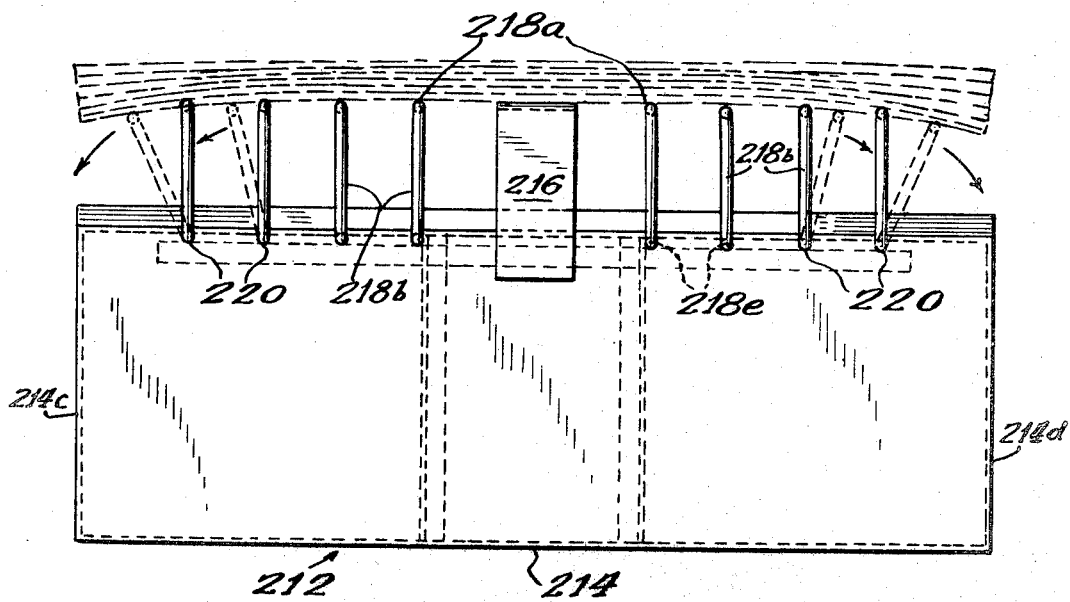
FIGURE 17 is an enlarged end view of the stacking tray connected to the rear of the burster.
Figure 18:
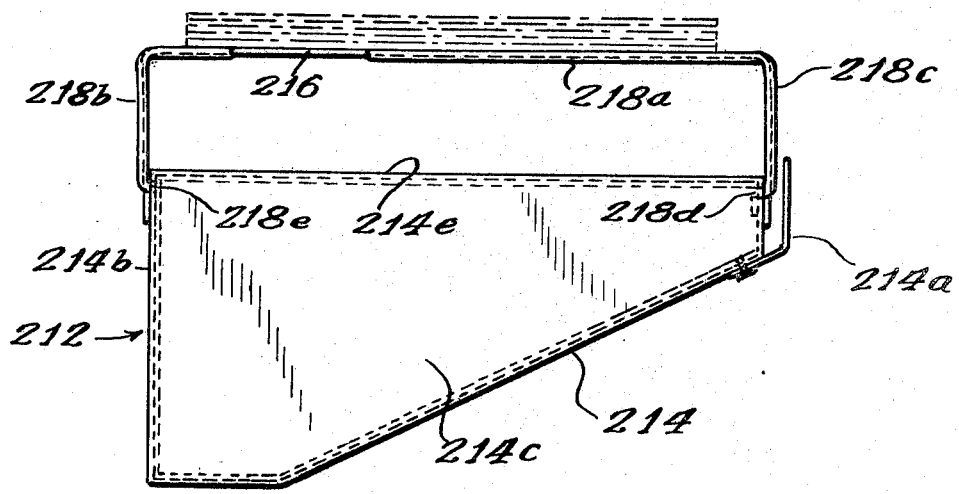
FIGURE 18 is a side elevational view of the stacking tray shown in FIGURE 17.

The burster 10 of this invention is utilized for processing a stack of zig-zag folded stationery 12 which may be fed into the burster from a shelf 14 at the forward end thereof. Where the burster is operated in tandem with printing equipment, stationery fed directly therefrom is held under infeed control with the aid of a pivoted dancer bar 16. The main function of the burster is to separate the continuous form stationery along transverse lines of weakening into individual form lengths 12a. For this purpose, the burster includes an infeed roller assembly 18, for feeding stationery into the burster; a movable burster roller assembly 20, having tension means 20a; and outfeed roller assembly 22 which is driven at a faster rate of speed than the movable burster roller assembly 20 for separating the form lengths along lines of weakening with the assistance of the initiation of the tearing action by the tension means 20a. In general, this type of structure and theory of operation is well-known in the art and is typically represented by the Pine et al. Patent No. 3,161,335.

In addition, the burster may be provided with other stationery processing means such as a trimmer assembly 24 interposed in the path of stationery travel for removing marginal material from the stationery. A main drive means, such as a motor 26 controlled by switches 26a is mounted in the framing 28 which is enclosed by a generally box-like decorative housing 30.

With particular reference to FIGURES 1, 3, 8 and 9, the drive components include a main drive belt 32 which is driven by the motor 26 and is reeved about a pulley 34 having a reduced pulley portion 34a. Pulley 34 is connected to the lower roller shaft 35 of the stationery roller assembly 22. The opposite end of the stationery roller shaft 35 to which pulley 34 is affixed has a pulley 35a. A timing belt 36 is reeved about pulley 35a and a reduction pulley 38 mounted on pivot arm 40 and a trough-like arm 42. Pivot arm 40 is pivoted to the burster at 40a for movement through an arcuate path of travel responsive to movement of other components of the drive system as will be explained.

As best seen in FIGURE 9, reduction pulley 38 is rotatably mounted on a main pin or shaft 44 with the aid of bearings 46. The periphery of the pulley 38 has a plurality of spaced separator rings 48 for maintaining separation between the several belts 36, 50 and 52 which are reeved around the periphery thereof. This pulley, being larger than the pulley 35a on the stationery roller assembly, accomplishes a reduction in the peripheral speed transmitted thereto by the belt 36.

Belt 50 is reeved about a pulley 51a on shaft 51 of the infeed roller assembly for driving that assembly at a reduced rate of speed relative to the stationery roller assembly 22.

Connecting belt 52 runs from the reduction pulley 38 to an idler pulley 54 mounted in trough-like arm 56 which is connected to the arm 52 at 57. As best seen in FIGURE 8, this idler pulley 54 is mounted for rotation about a pin 58 with the aid of bearings 60. Separator rings 62 on the periphery of the pulley maintain the connecting belt 52 separate from a timing belt 63.

The pin 58 is also rotatably mounted in a strap 64 which extends from arm 56 to the movable roller assembly where movable roller pulley 66 is rotatably mounted in the strap with the aid of bearings 66a held held therein by snap ring 66b. Shaft 68, which is an extension of the movable roller assembly 20, is keyed at 68a to the movable roller pulley 66. Pulley 66 is affixed against movement axially outwardly from the shaft by the retaining ring 70.

The movable roller assembly may be mounted for to and fro movement in the burster relative to the infeed rollers 18 and the stationery outfeed rollers 22 by suitable mechanism such as that claimed and described in the aforementioned Pine et al. Patent 3,161,335. By way of brief explanation, the mechanism disclosed in that patent includes a small motor on the assembly which drives a pinion which, in turn, is in engagement with a rack so that the assembly may be moved upon actuation of the motor by engagement of the rack and pinion. In the burster of the instant invention, when the movable roller assembly 20 is moved in the path of stationery travel, the arms 40, 52–56 and strap 54 will all pivot to accommodate this movement. However, none of the timed relationship between the several driving components will be disturbed by virtue of the aforedescribed belt drive arrangement.

Returning to FIGURE 1, a belt 76 is reeved about the reduced pulley portion 34a of pulley 34 and also reeved about the variable diameter pulley assembly 78 which includes fixed pulley 78a and variable pulley 78b. This pulley assembly, in turn, drives belt 80, which is reeved about the conveyor assembly drive pulley 82.

Pulley 82 engages gear 82a which, in turn, meshes with gear 82b to drive the conveyor assembly as will be explained later. Intermediate the path of the belt 80, there is provided a spider 84 which is pivotally mounted to the burster at 86 and supports a plurality of idler pulleys 88 about which the belt 80 is at least partially peripherally wrapped. The upper end of a spider is provided with a forked end 90 which receives a stub 92 that is movably mounted with respect to slot 94 as will be explained later. This to and fro movement of slot 92 will cause the spider 84 to pivot about its mounting 86. As the spider pivots the relative position of idlers will be changed to thereby change the tension in belt 80.

Turning now to FIGURE 7, pulley assembly 78 includes a main shaft 98 which is fixed to the frame at 100. The variable diameter pulley portion 78b includes a stationary pulley half member 102 and a movable pulley half member 104. The stationary member 102 has a hub portion 106 and a bearing 108 is pressed in bore 104a of member 104 over hub 106. Bearings 110 are interposed between the shaft 98 and the bore 106a of the stationary member 106. Thus the variable diameter pully 78b is rotatably mounted with respect to shaft 98, and the movable pulley portion 104 is slidably mounted with respect to the fixed portion 102. The fixed or stationary member 102 includes a slot 112 in the hub 106 in which a key 114 is interposed. This key occupies a slot 115 in the fixed pulley 78a to fix the sheave or pulley 78a to the hub 106 and therefore the variable pulley 78b. A spring 116 is interposed between the sheave 78a and the movable pulley portion 104.

Belt 80 is wound about the variable pulley 78b and as the tension on the belt 80 is increased by movement of spider 84 responsive to movement of the stub 92, this increased tension causes the movable pulley member 104 to slide axially away from the stationary member 102 against the urging of spring 116. This reduces the effective diameter of the variable pulley 78b (relative to belt 80), thereby changing the peripheral speed transmitted by the belt 80. This, in turn, causes the conveyor belt pulley 82 to be driven at a different speed. The effect of this difference in speed and the reasons therefore will be explained later in detail. For the present it should be remembered that the driving force will be transmitted to the conveyor assembly pulley 82 by means of the variable diameter pulley 78b, the effective diameter of this pulley being changeable (and therefore the speed transmitted to the pulley 82 being changeable) responsive to movement of the spider 84 by stub 92.

Referring now to FIGURES 2 and 4 through 6, a conveyor assembly 120 is positioned in the path of stationery travel immediately to the rear of the outfeed or fixed burster roller assembly 22. The purpose of the assembly 120 is to receive the individual form lengths which are separated and ejected outwardly from the roller assembly 22 and carry the same away for deposit on a stacking tray 121 from which the forms may be demoved.

Conveyor assembly 120 includes a platform 122 having brackets 124 at the end adjacent the roller assembly 22. Spring urged idler rollers 126 are mounted in brackets 128 on shafts 130 which also extend through the brackets 124. Springs 132 urge the rollers 126 outwardly by abutment with the brackets 128. In general, the structure described is similar to that found and shown in the Peterson et al. Patent 3,261,603, issued July 19, 1966.

At the opposite or outfeed end of the conveyor assembly, brackets 134a and 134b are affixed to the platform 132. A pair of generally vertically spaced shafts 136 and 138 are rotatably journalled in the brackets with the upper shaft 136 mounted on an axis which is slightly to the rear of the lower shaft 138. A plurality of rolls 140 are fixed on the shafts 136 and 138. A gear 142 is mounted on one end of shaft 138, and this gear is in driving engagement with the conveyor assembly drive pulley assembly 82 by engagement with gear 82a to transmit force received by the conveyor assembly pulley 82 and impart this force to the shaft 138 and the rolls 140 mounted thereon.

Belts 144 are wrapped about the several rolls 126 and 140, the belts 144 traveling a generally horizontal path on the top of the conveyor assembly, a downwardly and slightly inwardly returned path between the rolls 140 on the shafts 136 and 138, and an upwardly returning path between the rolls 140 of the shaft 138 and the spring urged rollers 126 at the opposite end of the platform 122. These belts provide a moving surface for carrying the separated form lengths away from the outfeed rollers 22. Furthermore, the portion of the belt 144 between the shafts 136 and 138 provides a moving surface which tends to follow the trailing edge of the separated form length and urge the separated form lengths into a tightly compacted stack on the stacking tray.

Spanning the conveyor assembly 120 and intersecting the path of stationery travel as it is fed outwardly from the rollers 22, is a nip roller assembly 148. As best seen in FIGURES 2, 10–12 and 13 and 14, this assembly includes a mounting shaft 150 which is rotatably mounted in slide blocks 152 and 154, the later performing a locking and unlocking function as will be explained later. A plurality of nip roller brackets 156 are mounted at spaced intervals along the bar or shaft 150. The lower portion of each bracket 156 is bifurcated at 158 and receives a small wheel 160 which is rotatably mounted on an axle 162. The forward facing surface, or that surface which opposing the flow of stationery travel outwardly from the rollers 22 is inclined relative to the upper surface of the conveyor assembly 120 so that as paper is fed outwardly from the rollers 22, it will strike the surface 164 and be deflected onto the belts 144. The inclined face 164 which presented to the outwardly ejected form insures that the form will be deflected downwardly into the area of engagement between the wheel 160 and the belt 144 so as to be properly advanced in sequential order over the conveyor platform 122 to be deposited on the stacking tray 121.

As best seen in FIGURES 2 and 10 through 12, a slide assembly is provided for moving the nip roller assembly 148 to and fro in the path of stationery travel to place surface 164 in the optimum position for deflecting form lengths of different dimensions. The blocks 152 and 154 are each affixed to side plates 166 (only one shown) which are mounted in the housing on either side of the path of stationery travel adjacent the conveyor assembly 120. The illustrated side plate 166 includes a pair of vertically spaced slots 168 and 170 which receive brake shoes 172 and 174. The brake shoes have notches 172a and 174a which engage opposite edges of slots 160 and 170, respectively. In addition, each shoe has an opening 172b and 174b, the opening 174 being threaded to threadably receive threaded end 176a of lock shaft 176. The lock shaft 176 extends through a bore 178 in block 154 and is provided with an enlarged knob 180 at the top. An enlarged portion 182 is formed about the shaft 176 between the knob 180 and the top of block 154 to limit the extent to which the shaft 176 may be threaded into the threaded opening 174b in the brake shoe 174. In operation, as the knob 180 is rotated, the brake shoes 172 and 174 will be moved relative to each other, so as to be moved into or out of locking engagement with a rail-like brake member 183 affixed to the burster.

A slide member 184 is mounted on each side plate 166 and engages with a mating slide member 186 connected to the burster housing to mount the slide assembly for slidable movement with respect to the housing. In general, members 184 and 186 are similar to those slide members used in cabinetry.

Thus, the nip roller assembly may be moved toward and away from the outfeed rollers 22 to adjust the assembly for properly receiving and deflecting individual form lengths of different dimensions by loosening the knob 180 and moving the assembly relative to the path of stationery travel and then rotating the knob 180 to a locking position to lock the brake shoes 172 and 174 about member 183 when the desired position has been reached. For convenience in ascertaining the proper positioning of the nip roller assembly for different form lengths of stationery, a scale graduated in form length dimensions may be provided along one side of the burster housing 30.

The stub 92 which was previously referred to in FIGURE 1 where it is shown as occupying the forked end 90 of the spider 84, is affixed to the side panel 166 of the slide assembly so that the stub 92 moves with the slide assembly. Therefore, when the adjustment of the nip roller assembly 148 is made to accommodate form lengths of different dimensions, the spider 84 will be pivoted about 86 at the same time by virtue of the engagement with the stub 92 with the forked end 90. This, as previously explained, will change the rate of speed at which the conveyor pulley 82 is driven. Therefore, the speed of belts 144 which form the moving surface for carrying the stationery away from the outfeed roller assembly 22 after it has been deflected by the nip roller assembly 148 will be adjusted for optimum speed with respect to the individual form lengths which are ejected to maintain a desired amount of overlap of the ejected forms.

The slide assembly also mounts and supports the paper deflector and stacking tray actuator assembly 188. This assembly 188 includes a rod 190 which is pivotally mounted in side plates 166 through bearings 198. The rod supports outwardly extending arms 192 which, in turn, support a transversely extending cross bar. A plurality of fingers 196 depend from the cross bar 194 between slots 198a formed in the deflector plate 198. A cam 200 is mounted on arm 192 and has a flat surface 200a which engages a follower 202a of switch 202. The switch 202 is connected to tray descent mechanism 204. As stationery is fed outwardly from the burster by the belts 144, it is caused to strike the plate 198 and hit the fingers 196. This will cause a deflection of the arms 192 which, in turn, through the aforementioned cam structure and switch, will actuate the tray descent mechanism 204 thereby causing the same to move the tray downwardly in response to stationery which is fed outwardly from the burster.

Since the assembly 188 is also connected to the slide assembly, this will be moved to and fro with respect to the path of stationery travel to place the fingers 196 in the optimum position for deflecting different form lengths when the slide assembly is moved to adjust the nip roller assembly 148 and the speed of the belts 144. Therefore, by movement of the slide assembly to the desired position as determined on an appropriate scale formed on the housing 30 graduated in dimension of form lengths of stationery, simultaneous adjustment are made for the proper placement of the nip roller assembly 148, the proper speed of the belts 144 and the location of the tray, paper deflector and stacking tray actuator assembly 188 with respect to the particular form length of stationary which is being separated by the burster. All of these adjustments will insure that the optimum outfeed conditions are provided for the separated form lengths to permit the fastest possible operation of the burster.

The tray descent mechanism 204 includes a motor 206 mounted near the rear end of the burster. The motor is in electronic communication with the switch 202 so that intermittent activation thereof responsive to deflection of the arms by the paper intermittently activates the motor. When the motor is activated, carriage 208 is driven downwardly relative to track 210 on which it is mounted.

Tray assembly 212 is fixed to the carriage and includes a frame 214 including a front wall 214a, a rear wall 214b and side walls 214c and 214d which are spanned by a top surface 214e. The outfeed tray includes a relatively wide, rigid U-shaped central support 216 which extends upwardly from the front wall 214a and the rear wall 214b and spans the distance therebetween. A plurality of U-shaped paper support bars 218 including central support surface 218a and upright end sections 218b and 218c are pivotally mounted to the frame of the tray assembly by means of inturned ends 218c and 218d being received in openings 220 formed in the front and rear walls 214a and 214b. The bars are frictionally related to the openings 220 so as to permit the bars to be moved from an upright or supporting position to a downwardly folded or retracted position as shown in dotted outline in FIGURE 17. The paper deflecting fingers 196 will normally occupy the spaces between bars 218 to limit the lateral movement of the stationery.

Frequently continuous form stationery may have marginal areas which tend to have a greater thickness due to the presence of crimp fastening elements, glue lines, or the like. This is especially true in the case of multiple ply forms and particularly more so in the case of those forms which have not been submitted to a trimming operation. In such a case, the stack of burst forms is thicker at the opposite marginal edges. Unless compensated for, the stack assumes an upwardly bowed configuration and is difficult to handle. Frequently it may slip out of an attendant's hands and fall into general disarray and out of sequential order. By mounting the paper support bars 218 for movement between an upright position to a retracted position, a means is provided for accommodating marginal thicknesses in stationery. More particularly, if the bars are folded downwardly as indicated in dotted outline in FIGURE 17, the marginal areas of stationery which may be stacked on the tray assembly 214 may droop downwardly. Thus several hundred plies of stationery may be stacked one on top of the other on the tray assembly before the marginal edges of even multiple ply or crimp fastened forms which have not had the margins removed begin to adopt an upwardly bowed configuration. Prior to that time, the several hundred forms may be removed from the tray assembly safely without the possibility of spillage or disarray thereof. By providing several of the support bars 218 with a pivotal mounting as shown, a means is established for accommodating different widths of form lengths in that one or more of the paper support bars on each side of central support 216 may be pivoted downwardly to accommodate the marginal thicknesses of stationery being processed.

The burster of this invention provides a means for adapting the various outfeeding components thereof for optimum feeding conditions dependent upon the dimension of the form length being separated thereby. The adjustment of the nip roller assembly to an optimum position for the desired ticket length being separated also adjusts the conveyor belt assembly to the optimum speed for such a ticket while furthermore placing the paper deflecting fingers at the outfeed end of the machine at the proper point for deflecting form lengths of a given dimension. The speed of the conveyors is automatically adjusted by a novel arrangement including a variable pitch pulley. The outfeed tray is provided with a means for accommodating thickness in the marginal areas of stationery to assure neat and orderly stacking of the several plies of stationery. All of these features provide a burster which is capable of adequately bursting continuous form stationery at the highest possible rate of speed for each given form length and which affords optimum stacking of separated form lengths throughout a wide range of speeds from very low to very high speed operation. While the term "burster" has been used throughout to refer to a mechanism for separating continuous form stationery, and the invention herein has been described for use with a "burster," it is to be understood that the invention is generally capable of use with any mechanism which separates continuous stationery into individual form lengths where that separation is accomplished by tearing action initiated across a line of weakening or a slicing or cutting action.

The foregoing detailed description has been given for clearness of understanding only, and no unnecessary limitations should be understood therefrom, as some modifications may be obvious to those skilled in the art.

We claim:

1. In a mechanism having means for separating continuous form stationery along transverse lines of weakening into individual form lengths, an outfeed assembly, comprising: means in the burster defining a path of stationery travel; means in the path of stationery travel beyond the bursting means defining a platform; a movable surface on said platform; means for driving said movable surface; means for changing the speed at which the movable surface is driven to accommodate different form lengths of stationery to adjust the surface for optimum outfeed conditions for such different form lengths; and means adjacent the platform across the path of stationery travel for initially deflecting stationery fed outwardly from the bursting means, said initial paper deflecting means being movable to position the same for optimum performance with respect to the longitudinal dimension of the form length being separated.

2. The outfeed assembly of claim 1 wherein the initial paper deflecting means is operably connected with the means for changing the speed of the movable surface by means responsive to movement of the initial paper deflecting means so that movement of the initial paper deflecting means automatically changes the speed of the movable surface.

3. The outfeed assembly of claim 2 wherein the initial paper deflecting means is normally mounted over the platform and closely adjacent the bursting means.

4. The outfeed assembly of claim 2 including a stacking surface and second means for deflecting stationery from the moving surface onto a stacking surface, said second deflecting means being connected to said initial paper deflecting means for movement therewith to adjust the second deflecting means concurrently with movement of the initial deflecting means.

5. In a burster mechanism for separating continuous form stationery into individual form lengths along transverse lines of weakening, said burster including a housing having means defining a path of stationery travel, sets of driven burster rolls in the path of stationery travel, means for driving the burster components, outfeed means for receiving a separated form length ejected outwardly by the bursting rollers, comprising: a platform having an infeed end and outfeed end and a moving surface thereon for carrying stationery away from the bursting rolls; a stationery stacking tray adjacent the outfeed end of the platform for receiving stationery therefrom and stacking the same; and a slide assembly positioned in the burster over the platform, the slide assembly including a first paper deflecting assembly for deflecting paper which is ejected outwardly by the rear most set of burster rollers to direct the stationery onto the moving surface of the platform, movement of said slide assembly changing the position of said first paper deflecting assembly to position the same at the optimum position for proper deflection of paper of given form lengths.

6. The burster of claim 5 wherein the means for driving the moving surface of the platform is connected to the slide assembly by means responsive to slide assembly movement so that movement of the slide assembly for adjusting the first paper deflecting assembly will also change the speed of the moving surface of the platform for different form lengths of stationery which are separated by the burster.

7. The burster of claim 6 wherein the moving surface of the platform is driven by means in engagement with a belt and wherein the belt passes over a member connected to the slide assembly for movement responsive to movement of the slide assembly, movement of the member changing the tension in the belt.

8. The burster of claim 7 wherein the belt which drives the conveyor assembly is also reeved about a variable pitch pulley so that the change in tension in the belt will change the effective pitch of the pulley, and thereby change the speed at which the belt and, consequently, the conveyor assembly is driven.

9. In a burster mechanism for separating continuous form stationery into individual form lengths along transverse lines of weakening, said burster including a housing having means defining a path of stationery travel and sets of driven burster rolls in the path of stationery travel, outfeed means for receiving separated form lengths ejected outwardly from the burster rolls, comprising: a platform having a moving surface thereon for carrying a stationery away from the burster rolls; drive means in the housing including a motor, pulley means connected to means for driving the moving surface of the platform, belt means for driving the pulley, said belt means being driven by said motor, and a tension member in the housing in engagement with the belt, said member being mounted for movement relative to the belt to change the tension in the belt, the pulley being movable responsive to a change in tension in the belt to change the output speed of the pulley whereby the speed at which the moving surface is driven will be changed responsive to movement of the tension member.

10. The outfeed means of claim 9 including paper deflecting means for deflecting paper fed outwardly from the burster, the deflecting means being movably mounted in the burster and connected to said tension member for movement thereof responsive to movement of the deflecting means so that movement of the deflecting means to accommodate form lengths of different dimensions will simultaneously change the speed at which the moving surface will be driven.

11. The outfeed means of claim 9 including first paper deflecting means adjacent the burster rolls for deflecting paper onto the moving surface and second paper deflecting means adjacent the outfeed end of the platform for deflecting paper carried by the moving surface into a stacked configuration, said first and second paper deflecting means being connected together for simultaneous movement and being movably mounted in the housing, said paper deflecting means also being connected to said tension member in the housing for movement thereof responsive to movement of the paper deflecting means whereby movement of the paper deflecting means to adapt the burster to burst stationery of different form lengths will change the tension in the belt to thereby change the speed at which the moving platform is driven.

12. The outfeed assembly of claim 11 including a stacking tray adjacent the outfeed end of the moving platform, a stacking tray having portions movable between a paper supporting position and a position removed therefrom permitting marginal portions of the stationery to droop relative to central portions thereof.

13. The outfeed means of claim 11 wherein the pulley means is a variable pitch pulley.

References Cited
UNITED STATES PATENTS

| | | | |
|---|---|---|---|
| 2,328,582 | 9/1943 | Ratchford et al. | 225—100 X |
| 2,355,690 | 8/1944 | Zent | 225—100 |
| 2,971,414 | 2/1961 | Owen | 83—311 X |
| 3,261,603 | 7/1966 | Peterson et al. | 225—100 |

JAMES M. MEISTER, Primary Examiner